(12) United States Patent  (10) Patent No.: US 7,716,528 B2
Hayem  (45) Date of Patent: May 11, 2010

(54) METHOD AND SYSTEM FOR CONFIGURABLE TRIGGER LOGIC FOR HARDWARE BUG WORKAROUND IN INTEGRATED CIRCUITS

(75) Inventor: Frederic Hayem, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 973 days.

(21) Appl. No.: 11/000,805

(22) Filed: Nov. 30, 2004

(65) Prior Publication Data
US 2006/0053343 A1   Mar. 9, 2006

Related U.S. Application Data

(60) Provisional application No. 60/607,727, filed on Sep. 7, 2004.

(51) Int. Cl.
*G06F 11/00* (2006.01)
(52) U.S. Cl. ............................ 714/30; 714/21; 714/35
(58) Field of Classification Search ............ 714/10, 714/21, 23, 30, 35
See application file for complete search history.

(56) References Cited

U.S. PATENT DOCUMENTS

| | | | | |
|---|---|---|---|---|
| 5,212,693 A * | 5/1993 | Chao et al. | | 714/5 |
| 5,426,778 A * | 6/1995 | Uchihori | | 714/10 |
| 5,907,708 A * | 5/1999 | Hohensee et al. | | 712/244 |
| 5,983,337 A * | 11/1999 | Mahalingaiah et al. | | 712/32 |
| 6,026,480 A * | 2/2000 | Oowaki et al. | | 712/37 |
| 6,131,174 A * | 10/2000 | Fischer et al. | | 714/733 |
| 6,412,081 B1 * | 6/2002 | Koscal et al. | | 714/34 |
| 6,708,270 B1 * | 3/2004 | Mayer | | 713/1 |
| 6,728,903 B1 * | 4/2004 | Kato | | 714/31 |
| 6,832,329 B2 * | 12/2004 | Ahrens et al. | | 714/5 |
| 6,883,116 B2 * | 4/2005 | Lee et al. | | 714/30 |
| 6,928,536 B2 * | 8/2005 | Duesterwald et al. | | 712/226 |
| 6,961,869 B2 * | 11/2005 | Miya | | 714/6 |
| 6,981,179 B1 * | 12/2005 | Shigemasa et al. | | 714/36 |
| 2002/0120810 A1 * | 8/2002 | Brouwer | | 711/103 |
| 2003/0097618 A1 * | 5/2003 | Kim et al. | | 714/39 |
| 2004/0193289 A1 * | 9/2004 | Chen et al. | | 700/3 |
| 2005/0223292 A1 * | 10/2005 | Lee et al. | | 714/35 |

* cited by examiner

*Primary Examiner*—Joshua A Lohn
(74) *Attorney, Agent, or Firm*—McAndrews Held & Malloy, Ltd.

(57) ABSTRACT

Aspects of configurable logic for hardware bug workaround in integrated circuits may comprise detecting within a chip at least one condition that would likely result in an occurrence of a hardware bug prior to the hardware bug occurring. Upon the detection of the condition, at least one trigger event may be generated within the chip via at least one debug signal, and the trigger event may be utilized to execute workaround code that may prevent the occurrence of the hardware bug. The debug signal may be generated inside the chip and/or outside the chip. The trigger event may be generated by combining a plurality of debug signals within the chip with at least one input or output signal of the chip.

20 Claims, 7 Drawing Sheets

METHOD AND SYSTEM FOR CONFIGURABLE TRIGGER LOGIC FOR HARDWARE BUG WORKAROUND IN INTEGRATED CIRCUITS

CROSS-REFERENCE TO RELATED APPLICATIONS/INCORPORATION BY REFERENCE

This application makes reference, claims priority to, and claims the benefit of U.S. Provisional Application Ser. No. 60/607,727 filed Sep. 7, 2004.

The above stated application is hereby incorporated herein by reference in its entirety.

FIELD OF THE INVENTION

Certain embodiments of the invention relate to integrated circuits. More specifically, certain embodiments of the invention relate to a method and system for configurable logic for hardware bug workaround in integrated circuits.

BACKGROUND OF THE INVENTION

Chips today are very complex devices, often having tens of thousands of transistors, if not hundreds of thousands or millions of transistors, that comprise complicated logic circuits and functionality. Although any bug in a chip or functionality not specified for the original chip can theoretically be worked around by external circuitry, practically speaking, only the simplest of these can be fixed externally because of the large amount of external circuitry that may be required. Therefore, when a hardware bug is found in a chip, great cost may be incurred in redesigning, laying out and manufacturing a new chip. Production of a system, of which the chip may be an integral part, may potentially be delayed by several months while waiting for the new chip, with even more cost incurred resulting from lost sales.

Conventional chips may provide the capability to observe critical internal logic signals on external pins for debugging purposes. These signals may be referred to as debug signals and may be accessible via a debug bus or debug port. A chip designer may also provide external access to at least the most important signals associated with the different hardware functions or blocks in the chip, since access to these signals may also be helpful during debugging.

Figure 1:
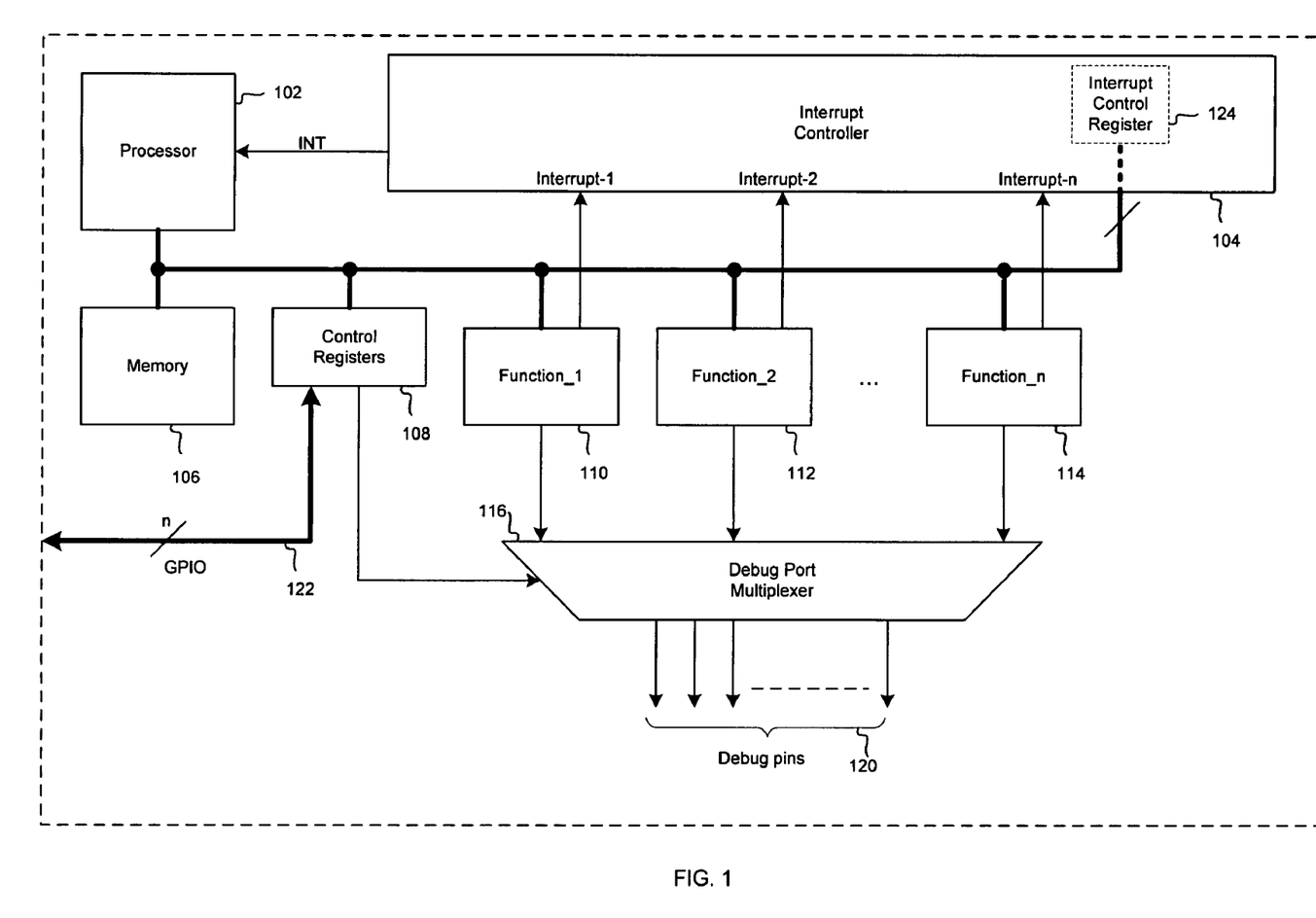
FIG. 1 is a block diagram of a typical architecture of an exemplary chip with an embedded processor.

FIG. 1 is a block diagram of a typical architecture of an exemplary chip with an embedded processor. Referring to FIG. 1, there is shown a processor 102, an interrupt controller block 104, a memory block 106, a control register block 108, a plurality of functions 110, 112, 114, a debug port multiplexer 116, a plurality of debug pins 120 and a plurality of general purpose I/O (GPIO) pins 122. The interrupt controller block 104 may comprise an interrupt controller register (ICR) 124. The functions may comprise Function_1 110, Function_2 112 and Function_n 114.

The processor 102 may be an embedded processor such as an ARM processor. The interrupt controller 104 may comprise suitable logic, circuitry and/or code that may be adapted to provide an interrupt signal INT to the processor 102, which indicates that certain functionality may have been completed or that there may be a problem that may require the attention of the processor 102. The memory 106 may be dynamic random access memory (DRAM), read-only memory (ROM), a non-volatile writeable random access memory (FLASH), and/or other types of memory. The functions 110, 112, 114 may comprise suitable logic, circuitry and/or code that may be adapted to perform specific functionalities needed for this system such as, for example, video processing, audio processing, or data encryption/decryption, as well as general functionalities needed for the chip to operate. The control register 108 may comprise suitable logic, circuitry and/or code that may be adapted to control the output of the debug signals from the debug ports multiplexer 116 to the debug pins 120. The multiplexer 116 may comprise suitable logic, circuitry and/or code that may be adapted to select which of the inputs from the functions 110, 112, 114 may be output to the debug pins 120.

The GPIO pins 122 may be coupled to functionality external to the chip, which may be adapted to provide input signals to the chip and/or receive output signals from the chip. The functionality of the GPIO pins 122 may be controlled by the control register block 108. The ICR 124 may comprise suitable logic, circuitry, and/or code that may be adapted to control occurrence and/or handling of interrupts by the interrupt controller 104.

In the exemplary system of FIG. 1, the processor 102 may execute instructions and/or use data in memory block 106, and may respond to at least one interrupt signal referred to as INT from the interrupt controller 104. The processor 102 may additionally control the functionality of the interrupt controller 104, may read and/or write to the control register block 108 in order to output the correct debug signals from the debug port multiplexer 116, and may control the functionality of the functions 110-114. The interrupt controller 104 may receive interrupt signals from the functions 110-114, and may generate the interrupt signal INT to the processor 102.

If a hardware bug exists in the exemplary system illustrated in FIG. 1, and the bug must be fixed, the only option may be to re-design the chip to remove the bug, and re-spin the chip.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for configurable logic for hardware bug workaround in integrated circuits. Aspects of the method may comprise detecting within a chip at least one condition that may result in occurrence of a hardware bug prior to the hardware bug occurring. The method may further comprise generating within the chip, at least one trigger event via at least one debug signal upon the detection of the at least one condition, and causing, by the at least one trigger event, execution of workaround code that prevents the occurrence of the hardware bug. The debug signal may be generated within the chip and/or outside the chip.

The method may further comprise generating the trigger event utilizing a plurality of debug signals within the chip, which may be combined with one or more input or output signals of the chip. In accordance with an embodiment of the invention, logic within the chip may be configured to combine a plurality of debug signals within the chip to generate the trigger event. The trigger event may be utilized to interrupt one or more processors, which may cause execution of the workaround code by the processor. An interrupt signal to the processor may be generated upon detection of the condition that may result in the occurrence of the hardware bug. The generated trigger event may be communicated via a feedback path as a feedback input to at least a portion of circuitry that generates the trigger event. A finite state machine may be implemented via the feedback input.

Aspects of the system may comprise circuitry that may be adapted to detect at least one condition within a chip prior to occurrence of a hardware bug. Circuitry may be provided that generates at least one trigger event within the chip via at least one debug signal upon detection of the condition. The at least one trigger event may cause execution of workaround code that prevents occurrence of the hardware bug. One or more debug signals may be generated via logic within the chip and/or via logic outside the chip.

The system may further comprise circuitry that may be adapted to combine one or more debug signals within the chip and/or one or more input and/or output signals of the chip to generate the trigger event. The trigger event may be generated by circuitry within the chip that is adapted to configure logic within the chip to combine a plurality of the least one debug signals within the chip. At least one processor may be interrupted via the trigger event, and the processor may execute the workaround code. An interrupt signal may be generated to interrupt the processor upon detection of the condition that cause occurrence of the hardware bug. The system may further comprise a feedback path that communicates the generated trigger event as a feedback input to at least a portion of the circuitry that may be utilized to generate the trigger event. A finite state machine may be implemented via the feedback input.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for configurable logic for hardware bug workaround in integrated circuits. An aspect of the invention may provide a method for maximizing the likelihood that a workaround for a hardware bug may be developed when a hardware bug is found. Accordingly, the invention may reduce the risk of having the chip re-spun when the chip has a bug. At least one debug signal may be generated via a configurable trigger logic (CTL) and utilized to generate a trigger event before the occurrence of the hardware bug. The trigger event may be utilized to interrupt a processor, and the processor may execute the hardware bug workaround. The aspect of the invention may comprise utilizing at least one debug signal, and/or at least one critical signal in the chip, and/or an input signal from outside the chip to generate the trigger event. Another aspect of the invention may comprise combining on-chip input and/or output signals with debug signals to generate a trigger event.

Figure 2:
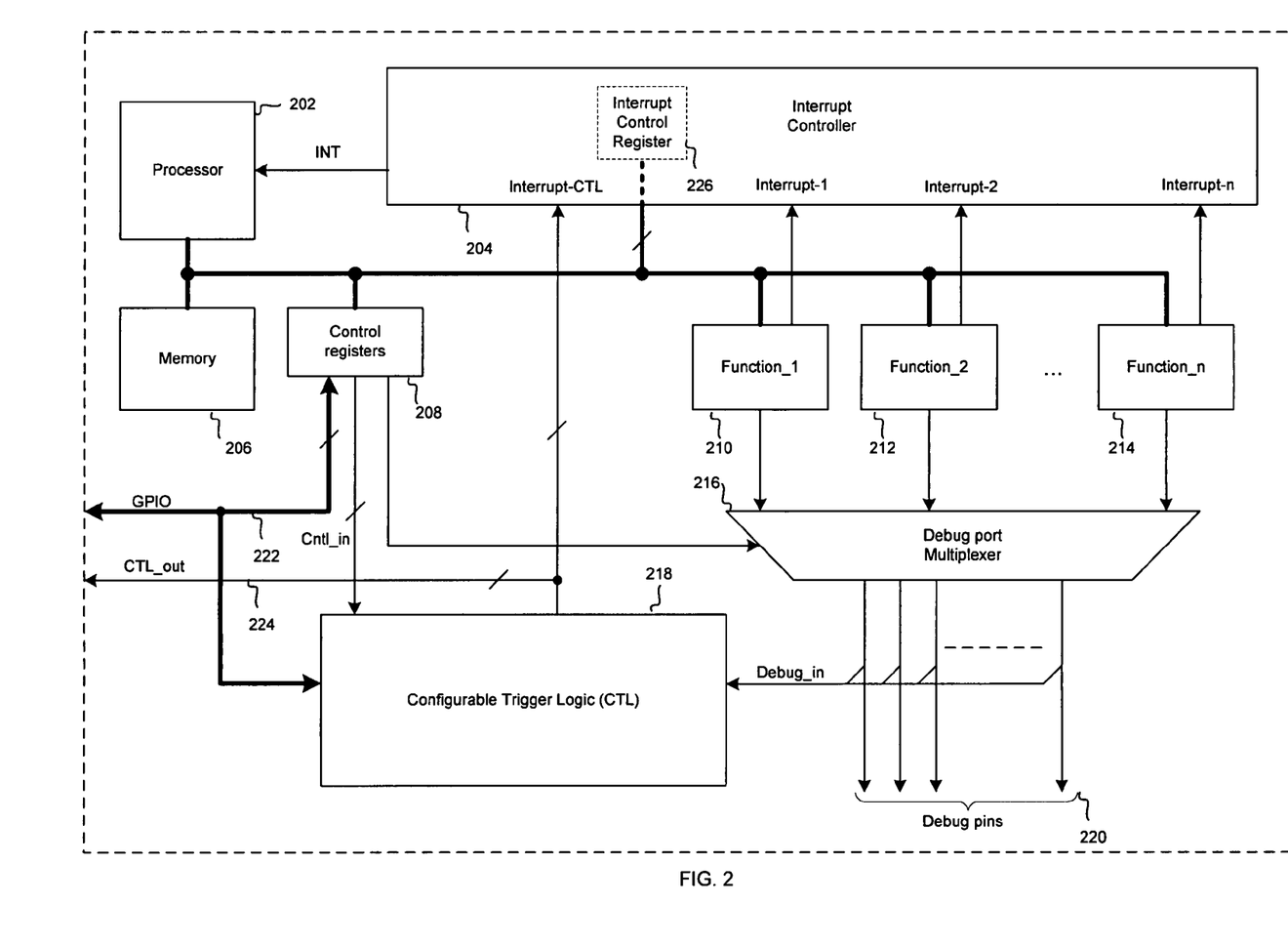
FIG. 2 is a block diagram illustrating an exemplary architecture of a chip, in accordance with an embodiment of the invention.

FIG. 2 is a block diagram illustrating an exemplary architecture of a chip, in accordance with an embodiment of the invention. Referring to FIG. 2, there is shown a processor 202, an interrupt controller block 204, a memory block 206, a control register block 208, a plurality of functions 210, 212, 214, a debug port multiplexer 216, a CTL 218, a plurality of debug pins 220, a plurality of general purpose I/O (GPIO) pins 222, and at least one control signal CTL_out 224. The interrupt processor block 204 may also comprise an interrupt control register (ICR) 226. The functions may comprise Function_1 210, and Function_2 212 through Function_n 214.

The processor 202 may be an embedded processor, such as an ARM processor. The interrupt controller block 204 may comprise suitable logic, circuitry and/or code that may be adapted to indicate, via at least one interrupt signal (INT), to the processor 202 that certain functionality may have been completed or that there may be a problem or an event that requires the attention of the processor 202. The ICR 226 may comprise suitable logic and/or circuitry that may be adapted to control occurrence and/or handling of interrupts by the interrupt controller block 204. For example, the ICR 226 may be utilized to enable or disable one or more interrupts that may be generated by the functions 210, 212 and 214. In an embodiment of the invention, if an interrupt from a function is disabled by the ICR 226, the interrupt controller 204 may not provide an interrupt vector via the interrupt signal INT to the processor 202.

The memory block 206 may be a dynamic random access memory (DRAM), read-only memory (ROM), a non-volatile writeable random access memory (FLASH), and/or other forms of memory. The functions 210, 212, 214 may comprise suitable logic, circuitry and/or code that may be adapted to perform specific functionalities, such as, for example, video processing, audio processing, or data encryption/decryption, as well as general functionalities needed for chip operation. The control register block 208 may comprise suitable logic, circuitry and/or code that may be adapted to control the output of the debug signals from the debug port multiplexer 216 to the debug pins 220.

The debug port multiplexer 216 may comprise suitable logic, circuitry and/or code that may be adapted to select which of the outputs from the functions 210, 212, . . . 214 should be transferred to the debug pins 220. The GPIO pins 222 may be coupled to functionality external to the chip that may provide input signals to the chip and/or receive output signals from the chip. The input signals on the GPIO pins 222 may also be communicated to the inputs of the CTL 218. The signals on the debug pins 220 may be communicated to the CTL 218 as the debug signal Debug_in. The control signal Cntl_in may be at least one signal from the control register block 208, and which may control the generation of the specific triggers or events by the CTL 218. The signal CTL_out 224 may comprise at least one signal that indicates when specific triggers and/or events may have occurred. The signal CTL_out 224 may be coupled to the interrupt controller block 204 and to at least one external pin. The processor 202 may configure the CTL 218 via the control register block 208.

In the exemplary system of FIG. 2, the processor 202 may execute instructions and/or use data in memory block 206. The processor 202 may also respond to the at least one interrupt signal INT from the interrupt controller block 204, may control the functionality of the interrupt controller block 204, and may write and/or read to the control register block 208 in order to output correct debug signals from the debug port multiplexer 216 to the debug pins 220. The processor 202 may be adapted to control the functionality of the functions 210, 212, 214. The interrupt controller block 204 may be configured to receive interrupt signals from the functions 210, 212, 214, and, in response, may generate at least one interrupt signal INT to the processor 202.

Figure 3:
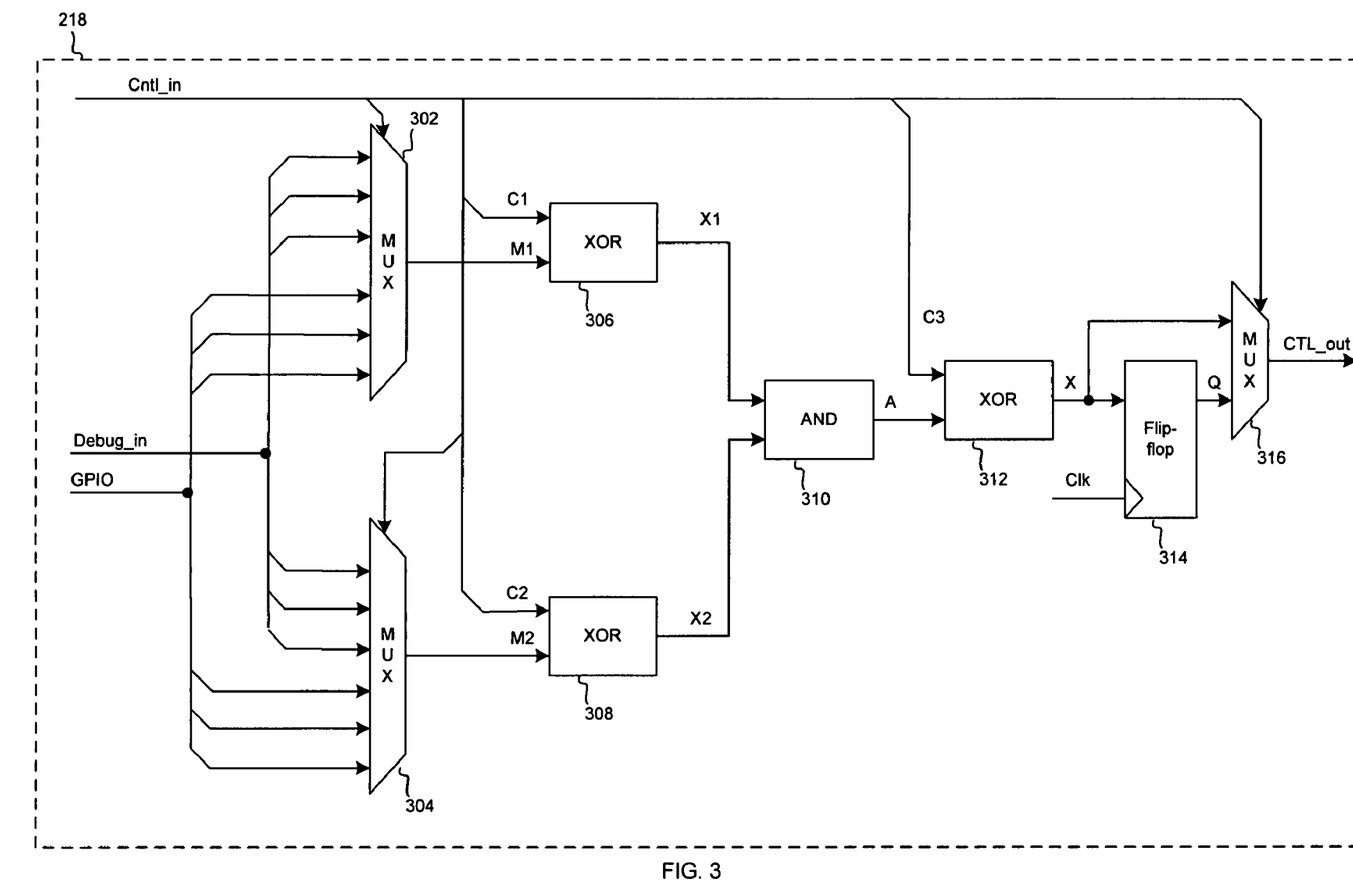
FIG. 3 is a block diagram illustrating an exemplary architecture of the CTL module of FIG. 2, in accordance with an embodiment of the invention.

FIG. 3 is a block diagram illustrating an exemplary architecture of the CTL module of FIG. 2, in accordance with an embodiment of the invention. Referring to FIG. 3, there is shown multiplexers 302, 304 and 316, XOR gates 306, 308 and 312, an AND gate 310, and a flip-flop 314. FIG. 3 also comprises a plurality of debug signals Debug_in, a plurality of input signals GPIO, and a plurality of control signals Cntl_in.

The multiplexers 302 and 304 may permit selection from the input signals GPIO and debug signals Debug_in, and outputs of the multiplexers 302 and 304 may be M1 and M2, respectively. The multiplexer outputs M1 and M2 may be communicated to first inputs of the XOR gates 306 and 308, respectively, and the XOR gates 306 and 308 may be utilized to optionally invert the multiplexer outputs M1 and M2 utilizing control signals Cntl_in, which may be specifically C1 and C2, respectively. Outputs of the XOR gates 306 and 308 may be X1 and X2, respectively, and X1 and X2 may be combined via the AND gate 310, and the resulting output may be a signal A.

The output signal A may be communicated as an input to the XOR gate 312, and may be optionally inverted by the XOR gate 312 via one of the plurality of control signals Cntl_in, which may be C3. An output signal X of the XOR gate 312 may be an input to the multiplexer 316 and an input to the flip-flop 314. An output of the flip-flip 314, which may be Q, may serve as a second input to the multiplexer 316. The output signal X may be communicated to the D-input of the flip-flop 314 such that the output signal Q of the flip-flop 314 may be synchronized to a clock input (Clk) of the flip-flop 314. The output signal, CTL_out, of the multiplexer 316 may be the output of the CTL 218 (FIG. 2), and may be selected from the output signal X and the output signal Q by control signals Cntl_in.

In accordance with an embodiment of the invention, the exemplary architecture of FIG. 3 may provide a plurality of Boolean combinations of M1 and M2 depending upon, for example, the values of the control signals that comprise the control signals Cntl_in. The following illustrates a plurality of Boolean combinations of the multiplexer output signals M1 and M2.

X=M1 AND M2=not (not M1 OR not M2)
X=not M1 AND M2=not (M1 OR not M2)
X=M1 AND not M2=not (not M1 OR M2)
X=not M1 AND not M2=not (M1 OR M2)
X=not(M1 AND M2)=not M1 OR not M2
X=not(not M1 AND M2)=M1 OR not M2
X=not(M1 AND not M2)=not M1 OR M2
X=not(not M1 AND not M2)=M1 OR M2

For example, the Boolean expression X=M1 AND M2 may be represented by negating an entire expression that ORs a negated M1 with a negated M2. The Boolean expression X=not M1 AND M2 may be represented by negating an entire expression that ORs M1 with a negated M2. The Boolean expression X=M1 AND not M2 may be represented by negating an entire expression that ORs a negated M1 with M2. The Boolean expression X=not M1 AND not M2 may be represented by negating an entire expression that ORs M1 with M2.

Similarly, the Boolean expression X=not(M1 AND M2) may be represented by ORing a negated M1 with a negated M2. The Boolean expression X=not(not M1 AND M2) may be represented by ORing M1 with a negated M2. The Boolean expression X=not(M1 AND not M2) may be represented by ORing a negated M1 with M2. The Boolean expression X=not(not M1 AND not M2) may be represented by ORing M1 with M2.

Figure 4:
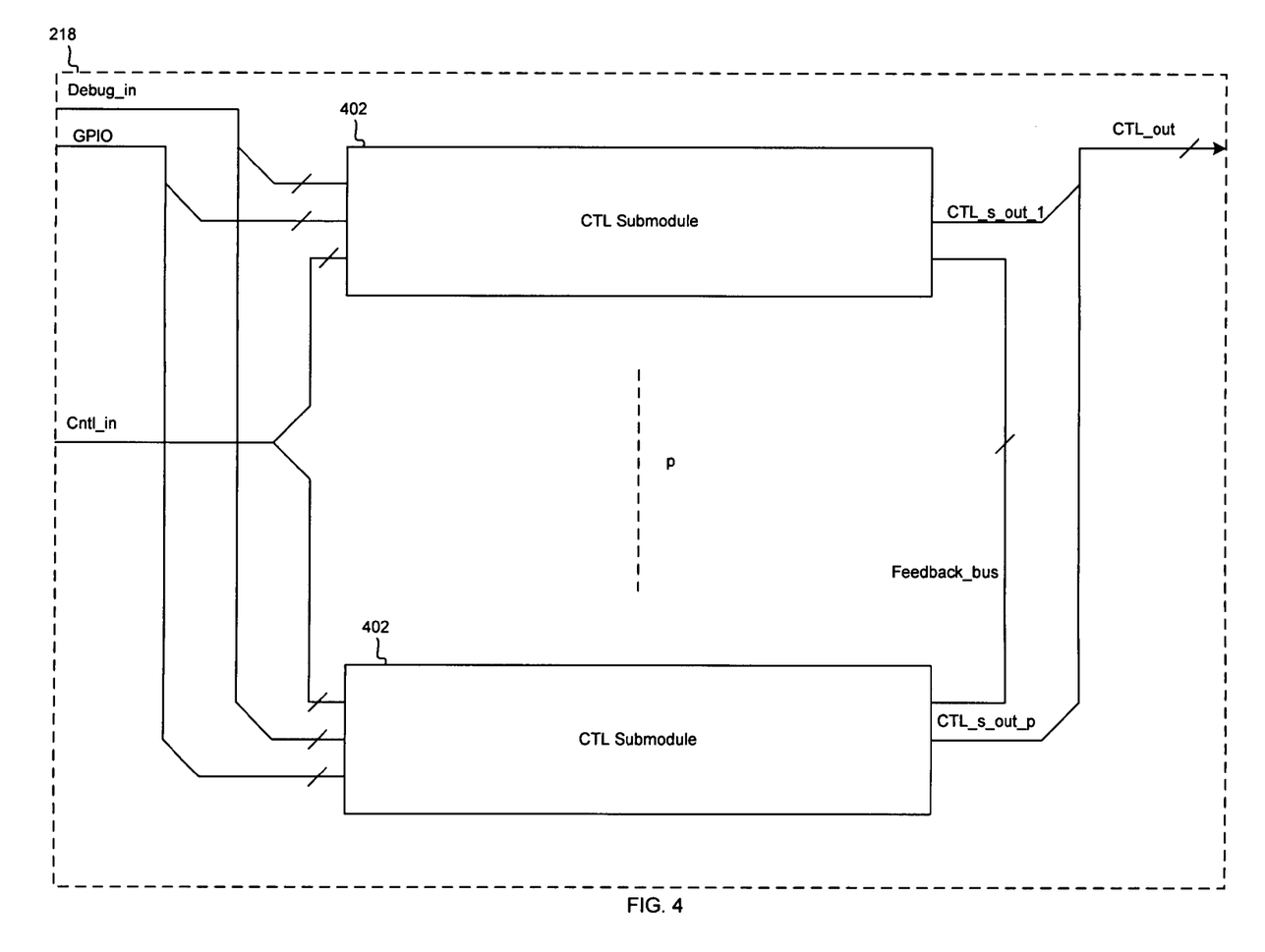
FIG. 4 is a high-level block diagram illustrating an exemplary architecture of an enhanced CTL module, in accordance with an embodiment of the invention.

FIG. 4 is a high-level block diagram illustrating an exemplary architecture of an enhanced CTL module, in accordance with an embodiment of the invention. Referring to the enhanced CTL module architecture of FIG. 4, there is shown a plurality of CTL submodules 402, a plurality of debug signals Debug_in, a plurality of general purpose input/output signals GPIO, a plurality of control signals Cntl_in, and a plurality of output signals CTL_s_out.

The signal CTL_out may comprise the plurality of output signals CTL_s_out. The CTL submodule 402 may be somewhat similar in functionality to the CTL 218 (FIGS. 2 and 3) in that there may be one output based on the inputs Debug_in, GPIO and Cntl_in for each CTL submodule 402, as there is one output for the CTL 218 (FIGS. 2 and 3) based on the same inputs. However, in comparison with FIG. 3, the CTL 218 (FIG. 4) may have more than one output since it may comprise many CTL submodules 402. In addition, each CTL submodule 402 may have a larger number of input signals than the CTLs shown in FIGS. 2 and 3. Additionally, the CTL submodule 402 may have feedback signals that may be collectively referenced as Feedback_bus, and these feedback signals may comprise outputs of CTL submodules 402.

The number of CTL submodules 402 and inputs to these CTL submodules 402 may vary according to chip design and requirements. A larger number of CTL submodules 402 and a larger number of inputs to the CTL submodules 402 may be more flexible in generating trigger events. However, the flexibility may come at the cost of additional gates on the chip.

In accordance with an embodiment of the invention, a finite state machine (FSM) may be configured in the CTL 218 (FIG. 4) that may allow design of very complex trigger events. Generally, a FSM may need state information and state transition input information. The FSM may utilize the state information and the state transition information in deciding how to transition between states. The state information may be provided by the feedback signals Feedback_bus, and the state transition information may be provided by a plurality of GPIO signals, a plurality of debug signals Debug_in, and a plurality of control signals Cntl_in.

Figure 5:
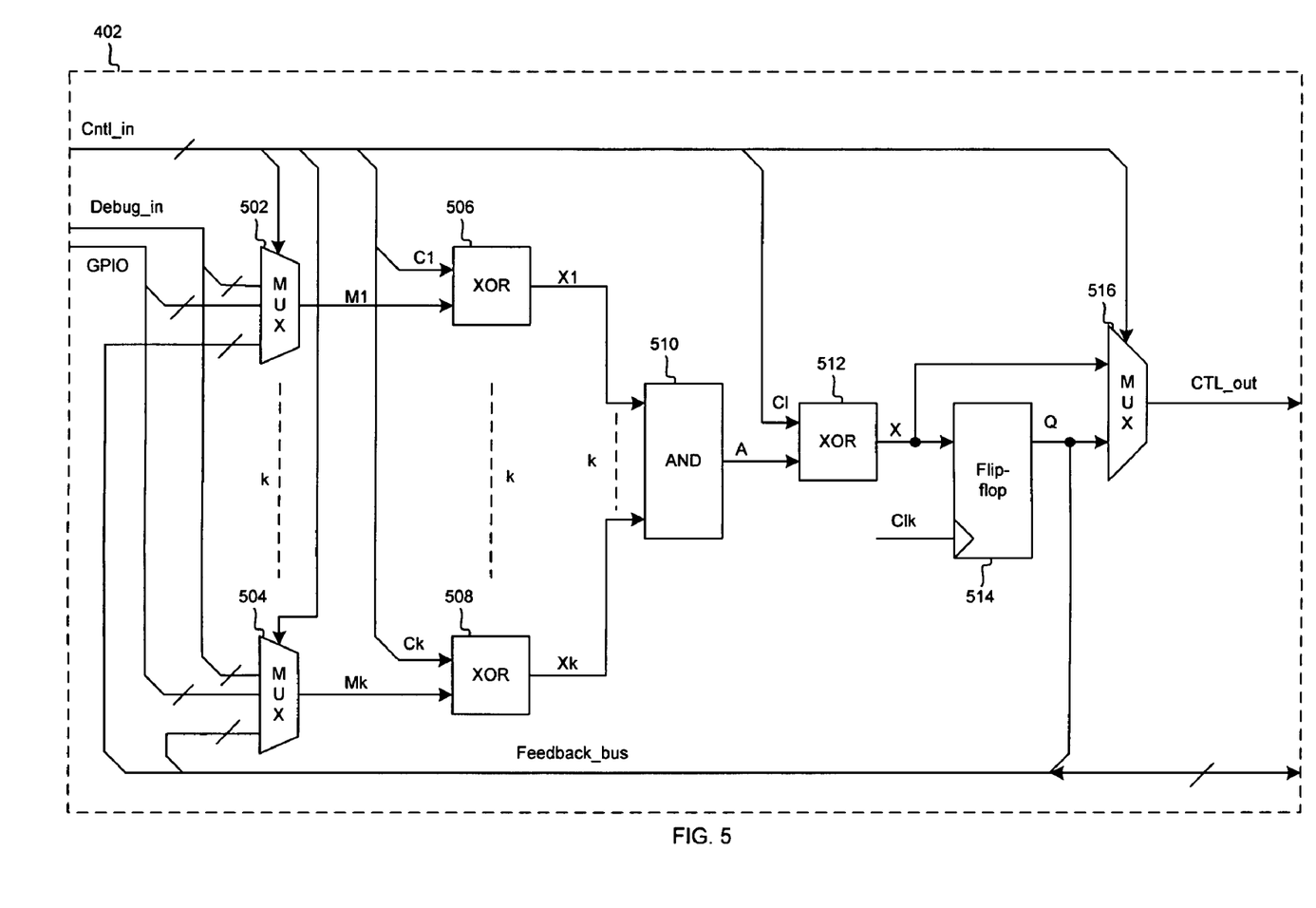
FIG. 5 is a block diagram illustrating an exemplary architecture of the enhanced CTL submodule of FIG. 4, in accordance with an embodiment of the invention.

FIG. 5 is a block diagram illustrating an exemplary architecture of the enhanced CTL submodule of FIG. 4, in accordance with an embodiment of the invention. Referring to FIG. 5, there is shown multiplexers 502, 504, and 516, XOR gates 506, 508 and 512, an AND gate 510, a flip-flop 514, and a plurality of debug signals Debug_in, a plurality of general purpose input/output signals GPIO, a plurality of input control signals Cntl_in, and an output signal CTL_out, and these devices may perform similar functionalities as described in FIG. 4.

Although only two multiplexers 502 and 504 are shown as receiving the Debug_in signal and the GPIO signals, there may be more than two multiplexers 502 and 504 which may be adapted to receive the inputs Debug_in and GPIO. FIG. 5 may comprise k multiplexers to receive inputs Debug_in and GPIO, where the first multiplexer is labeled 502 and the k-th multiplexer may be labeled 504. Similarly, there may be k XOR gates 506 . . . 508 coupled to the outputs of the k multiplexers 502 . . . 504. The outputs of the XOR gates 502 . . . 504 may be coupled to a k-input AND gate 510, and the output of the AND gate 510 may be coupled to the XOR 512. The output of the XOR gate may be coupled to the D-input of the flip-flop 514 and to the first input of the multiplexer 516. A signal A, an output of the XOR 512, at the D-input of the flip-flop 514 may be synchronized by the clocking signal Clk. A synchronized output signal Q generated by the flip-flop 514 may be communicated to the second input of the multiplexer 516. Accordingly, the flip-flop 514 may be adapted to function as a synchronization flip-flop.

The synchronized output Q may be fed back along with the outputs of other flip-flops in other CTL submodules 402 (FIG. 4) as input to the multiplexers 502-504. Each of the multiplexers 502 . . . 504 may have three sets of inputs. A first set of inputs may be a plurality of signals from the outputs of the CTL submodules 402, which may be collectively referred to as Feedback_bus. A second set of inputs may comprise debug signals Debug_in, which may be a plurality of signals internal to the chip. A third set of inputs may be GPIO, which may be a plurality of signals that may be inputs to the chip and may have originated externally to the chip. Each multiplexer 502 . . . 504 may choose specific outputs as indicated by at least one of the plurality of input control signals Cntl_in. The output signals M1 . . . Mk of the multiplexers 502 . . . 504, respectively, may be inputs to the XOR gates 506 . . . 508, and the signals M1 . . . Mk may be transferred to the outputs of the XOR gates 506 . . . 508 either as inverted versions of M1 . . . Mk or non-inverted versions of M1 . . . Mk. Whether the output of each XOR 506 . . . 508 may be an inverted version of the input may be indicated by at least one of the plurality of input control signals Cntl_in. The outputs of the XOR gates 506 . . . 508 may be referenced as signals X1 . . . Xk.

The signals X1 . . . Xk may be inputs to the AND gate 510. The output signal of the AND gate 510, A, may be an input to the XOR gate 512. The signal X may be an inverted version or a non-inverted version of the signal A, and whether the inverted version is selected or not may be indicated by one of the plurality of input control signals Cntl_in. The signal X which may be synchronized by the flip-flop 514, and the synchronized output signal Q of the flip-flop 514 may be communicated to an input of the multiplexer 516. The signal X, which may be unsynchronized, may also be communicated to another input of the multiplexer 516. The output of the multiplexer 516 may be the unsynchronized signal X or the synchronized output signal Q, as indicated by at least one of the plurality of input control signals Cntl_in.

As discussed in FIG. 4, the signals in the Feedback_bus may also allow an implementation of a finite state machine (FSM) in each of the submodules 402.

Figure 6:
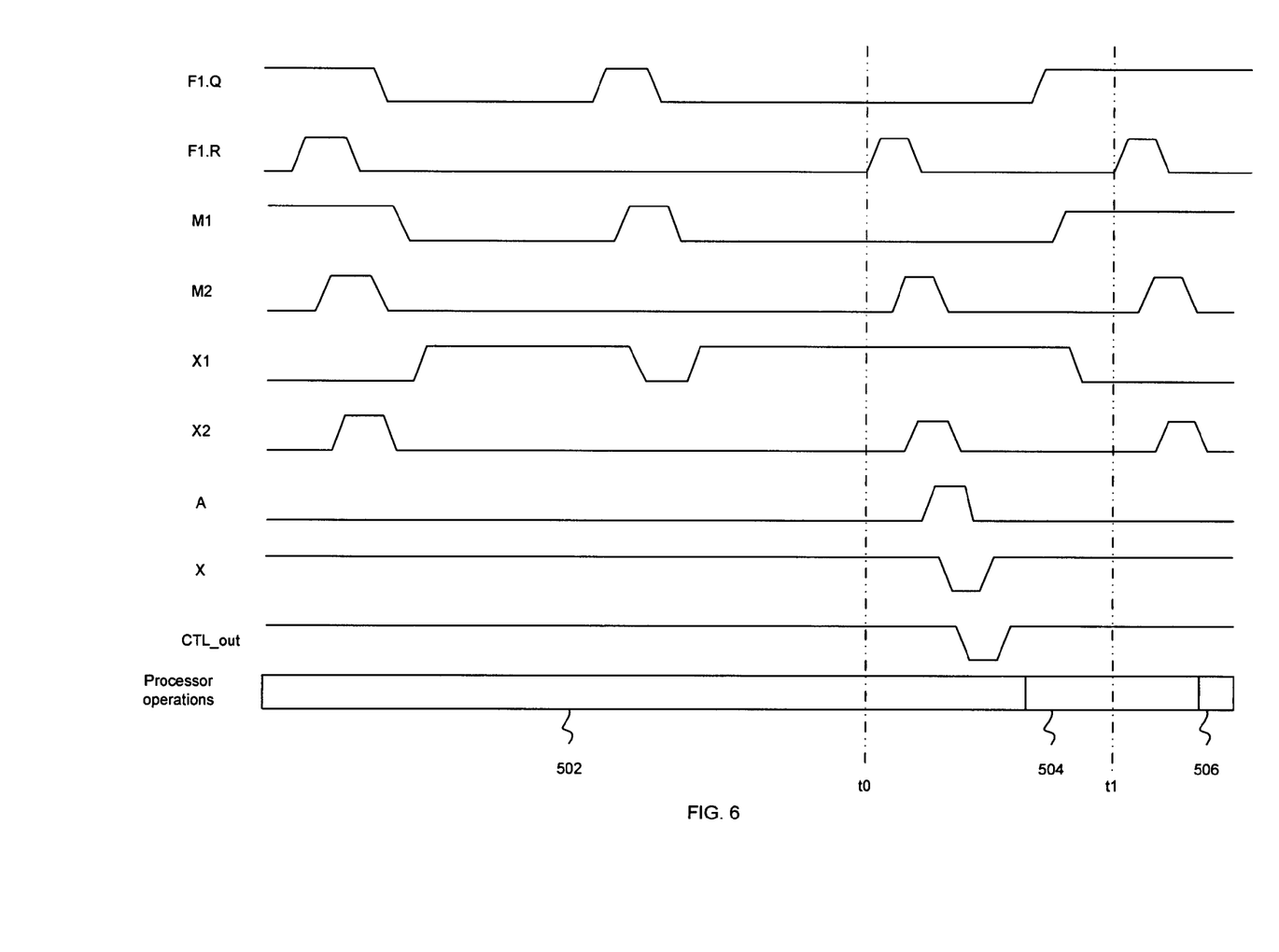
FIG. 6 is a timing diagram illustrating operation of the exemplary CTL module of FIG. 3, in accordance with an embodiment of the invention.

FIG. 6 is a timing diagram illustrating operation of the exemplary CTL module of FIG. 3, in accordance with an embodiment of the invention. Referring to FIG. 6, there is shown a timing diagram that comprises signals F1.Q, F1.R, M1. M2, X1, X2, A, X, CTL_out, and processor operations. Signal F1.Q may be an input to a multiplexer 302 (FIG. 3) and signal F1.R may be an input to a multiplexer 304 (FIG. 3), where F1.Q may indicate that a signal Q originated in Function_1 210 (FIG. 2). Similarly, F1.R may indicate that a signal R originated in Function_1 210 (FIG. 2). Signals M1 and M2 may be output signals of the multiplexer 302 and 304, respectively, and the output signals M1 and M2 may be communicated to an input of XOR gates 306 and 308 (FIG. 3), respectively. Signals X1 and X2 may be output signals of the XOR gates 306 and 308, respectively, and the output signals X1 and X2 may be communicated to the inputs of the AND gate 310. Output signal A of the AND gate 310 may be communicated to an input of the XOR gate 312, and the output signal of the XOR gate 312 may be signal X. The signal X may be communicated to an input of the multiplexer 316, and the multiplexer 316 may output the signal CTL_out.

In operation, it may be determined that a hardware bug occurs at time t1 after signals F1.Q and F1.R in Function_1 210 are such that F1.Q=0 and F1.R=1 at time t0. Utilizing the CTL 218 (FIG. 2), this condition may be detected and a workaround provided utilizing the various aspects of the invention. The goal may be to generate logic 0 (low) on the output of the CTL 218 to send an interrupt to the interrupt controller 204 (FIG. 2) which may then interrupt the processor 202 (FIG. 2). In order to achieve this, the following actions may be taken with reference to FIG. 3.

The signals F1.Q and F1.R, which may be debug signals in Debug_in, may be selected by the multiplexers 302 and 304 and may be output as the signals M1 and M2. The control signal C1, which may be part of the input control signals Cntl_in, may be set to logic 1 so that the XOR gate 306 may invert the input signal M1 and output the inverted signal as the signal X1. The control signal C2, which may also be a part of the input control signals Cntl_in, may be set to logic 0 in order that the XOR gate 308 may keep the input signal M2 unchanged and output the unchanged signal as the signal X2.

The signal X1 may be combined with the signal X2 via AND gate 310 to generate the output signal A. Control signal C3, which may be part of the input control signals Cntl_in, may be set to logic 1 so that the XOR gate 312 may invert the input signal A and output the inverted signal as the signal X. Control signal C4, which may be part of the control signals Cntl_in, may indicate to the multiplexer 316 to select the signal X as the output signal CTL_out.

The CTL 218 (FIG. 2) may be configured by the processor 202 (FIG. 2) utilizing the control registers 208 (FIG. 2) to perform CTL_out=not(not F1.A AND F1.B)=(F1.A OR not F1.B), and the output signal CTL_out may indicate to the interrupt processor 204 that the processor 202 may be interrupted each time a hardware condition which anticipates the hardware bug may occur. In response to the interrupt from the interrupt controller 204, the processor 202 may execute the hardware bug workaround to prevent the hardware bug. The hardware bug workaround may comprise writing a value to a register such that the register output may change an input to hardware circuitry that prevents the bug from occurring.

Figure 7:
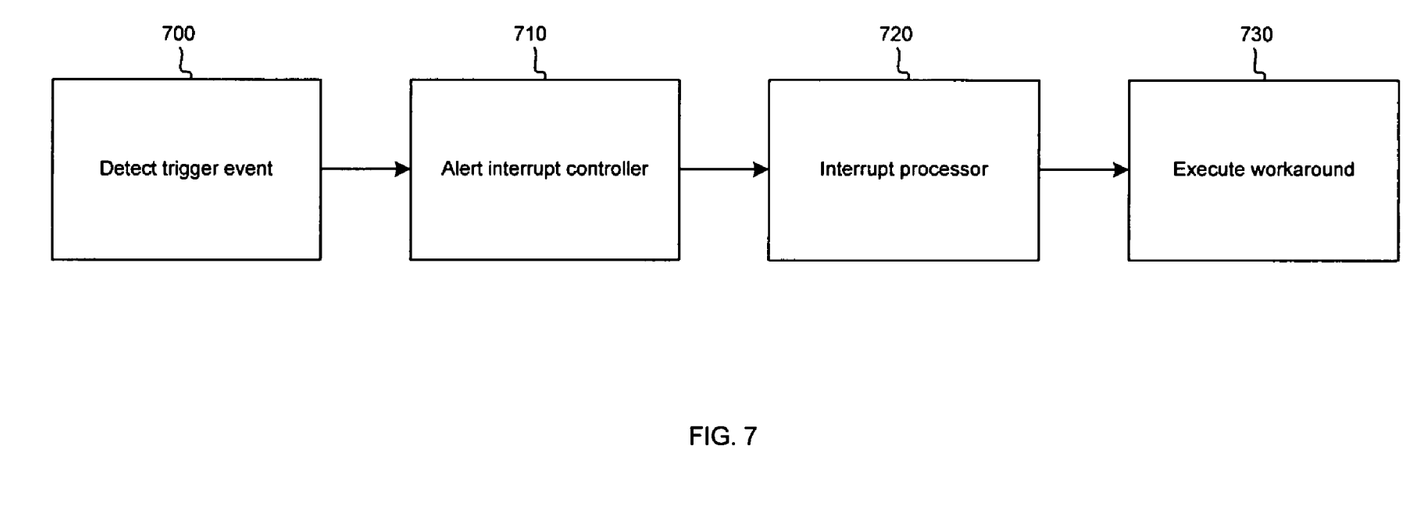
FIG. 7 is an exemplary flow diagram illustrating operation of the exemplary CTL module of FIG. 3, in accordance with an embodiment of the invention.

FIG. 7 is an exemplary flow diagram illustrating operation of the exemplary CTL module of FIG. 3, in accordance with an embodiment of the invention. In step 700, a triggering event may be detected. In step 710, the interrupt controller may be notified that a triggering event was detected. In step 720, the interrupt controller may interrupt the processor. In step 730, the processor may execute the workaround.

Referring to FIGS. 2, 3, 6, and 7, there is shown exemplary steps 700 to 730 that may be utilized to describe a hardware bug workaround. Accordingly, in step 700, the signals F1.Q (FIG. 6) and F1.R (FIG. 6) may have states that may indicate that a hardware bug may occur. The signals F1.Q and F1.R may be inputs to the multiplexers 302 and 304, respectively. The signals F1.Q and F1.R may propagate through the CTL 218 (FIG. 3), and may generate an output signal CTL_out. In step 710, the output signal CTL_out may be communicated to the interrupt controller 204 (FIG. 2). The output signal CTL_out may indicate that the interrupt controller 204 may interrupt the processor 202 (FIG. 2).

In step 720, the interrupt controller 204 may interrupt the processor 202, and in step 730, the processor 202 may execute the hardware bug workaround. The hardware bug workaround may comprise writing a value to an address, which may be a hardware register such that the register output may change an input to hardware circuitry such that the bug does not occur, or may cause a hardware state machine to not generate the bug.

The CTL submodule 402 illustrated in FIG. 5 may be one of a plurality of embodiments of the invention. In this regard, it allows the generation of very complex events from utilization of an increased number of input signals and the possibility of using finite state machines (FSM). In one embodiment of the invention, instead of sending a signal to an interrupt processor 204 (FIG. 2), an interrupt, which may comprise at least one signal, may be sent directly to the processor 202 (FIG. 2) when the processor 202 handles interrupts without an interrupt processor 204 external to the processor 202. In another embodiment of the invention, the CTL output may issue a Direct Memory Access (DMA) request to a DMA controller to write to an address, which may be an address of a register or a memory location in the memory block 206 (FIG. 2). Accordingly, in response to a request from the CTL 218, the DMA controller may write a pre-defined value that may be used to avoid the occurrence of the hardware bug. Alternatively, the CTL 218 may issue a request to a bus arbitrator for ownership of a bus so that the CTL 218 may similarly write a pre-defined value directly to an address, whether in the memory block 206 or in a register elsewhere.

Although FIG. 2 shows an exemplary embodiment in which the debug signals Debug_in comprise the outputs of the debug port multiplexers 216, the outputs of the functions 210-214 may be coupled to the CTL 218. In that regard, multiplexers such as those in debug port multiplexer 216 in the CTL 218 may choose the signals to be utilized. Alternatively, multiplexers may not be utilized and at least some of the signals from the outputs of the functions 210-214 may be communicated to input multiplexers such as the multiplexers 302-304 (FIG. 3). An alternate embodiment of the invention may be a hardware bug workaround that may be utilized to disable or ignore the interrupt that may be generated by the hardware bug. Another alternate embodiment may utilize microcode rather than software as a workaround.

Although the embodiments disclosed in FIGS. 3 and 5 use discrete logic such as multiplexers, XOR gates, AND gates, and flip-flops, the invention is not limited in this manner. Accordingly, other exemplary embodiments may use devices that may have similar functionalities as, or may be similar to, a phased array logic (PAL), a programmable logic array (PLA), or look-up tables in ROM or other memory, in which the input signals and the control signals may indicate a resulting output. Other exemplary embodiments may be implemented using any combination of PALs, PLAs, memory and/or logic.

Another embodiment of the invention may generate a hardware signal that may last for the duration of the hardware bug and prevent any hardware signals generated by the hardware bug from executing erroneous actions. For example, if any of the functions 210-214 generated an interrupt signal to the interrupt controller 204, those interrupt signals may be coupled to the CTL 218 where generated signals may not allow the erroneously generated interrupt signal from a function to propagate to the interrupt controller 204. One exemplary embodiment of the invention may combine, using an AND gate, the input CTL signal CTL_out and the interrupt signal which may have been erroneously generated by any of the functions 210-214.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
   detecting within a chip, at least one condition that would result in an occurrence of a hardware bug in one or more of a plurality of on-chip functions prior to said hardware bug occurring;
   generating within said chip, via a configurable control logic circuit, at least one trigger signal from at least one debug signal upon said detection of said at least one condition;
   generating, via an on-chip interrupt controller, an interrupt signal to a processor based on said generated trigger signal, wherein said on-chip interrupt controller handles interrupts for said plurality of on-chip functions;
   causing, by said generated interrupt signal, execution of workaround code that prevents said occurrence of said hardware bug in said one or more of said plurality of on-chip functions; and
   wherein said at least one debug signal is generated inside or outside the chip by debug circuitry that is controlled at least in part by an output of at least one of said plurality of on-chip functions.

2. The method according to claim 1, wherein said at least one debug signal is generated via internal logic within said chip.

3. The method according to claim 1, wherein said at least one debug signal is generated outside said chip.

4. The method according to claim 1, comprising generating said at least one trigger signal utilizing said at least one debug signal within said chip.

5. The method according to claim 4, comprising combining said at least one debug signal with at least one input or output signal of said chip.

6. The method according to claim 1, comprising configuring logic within said chip so as to combine a plurality of said debug signal within said chip for said generation of said at least one trigger signal.

7. The method according to claim 1, comprising interrupting at least one processor via said at least one trigger signal thereby resulting in said execution of said workaround by said at least one processor.

8. The method according to claim 1, comprising generating an interrupt signal to said at least one processor upon said detection of said at least one condition that results in said occurrence of said hardware bug.

9. The method according to claim 1, comprising communicating said generated trigger signal via a feedback path as a feedback input to at least a portion of circuitry that generates said trigger signal.

10. The method according to claim 9, comprising implementing a finite state machine via said feedback input.

11. A system for processing signals, the system comprising:
    circuitry that is operable to detect within a chip, at least one condition that would result in an occurrence of a hardware bug in one or more of a plurality of on-chip functions prior to said hardware bug occurring;
    circuitry comprising a configurable control logic circuit that is operable to generate within said chip, at least one trigger signal from at least one debug signal upon said detection of said at least one condition;
    circuitry comprising a configurable control logic circuit that is operable to generate an interrupt signal to a processor based on said generated trigger signal, wherein said on-chip interrupt controller handles interrupts for said plurality of on-chip functions;
    circuitry that is operable to cause, by said generated interrupt signal, execution of workaround code that prevents said occurrence of said hardware bug in said one or more of said plurality of on-chip functions; and
    wherein said at least one debug signal is generated inside or outside the chip by debug circuitry that is controlled at least in part by an output of at least one of said plurality of on-chip functions.

12. The system according to claim 11, wherein said at least one debug signal is generated via internal logic within said chip.

13. The system according to claim 11, wherein said at least one debug signal is generated outside said chip.

14. The system according to claim 11, comprising circuitry that is operable to generate said at least one trigger signal utilizing said at least one debug signal within said chip.

15. The system according to claim 14, comprising circuitry that is operable to combine said at least one debug signals with at least one input or output signal of said chip.

16. The system according to claim 11, comprising circuitry that is operable to configure logic within said chip so as to combine a plurality of said debug signal within said chip for said generation of said at least one trigger signal.

17. The system according to claim 11, comprising circuitry that is operable to interrupt at least one processor via said at least one trigger signal resulting in said execution of said workaround by said at least one processor.

18. The system according to claim 11, comprising circuitry that is operable to generate an interrupt signal to said at least one processor upon said detection of said at least one condition that results in said occurrence of said hardware bug.

19. The system according to claim 11, comprising a feedback path that communicates said generated trigger signal as a feedback input to at least a portion of said circuitry that generates said trigger signal.

20. The system according to claim 19, comprising circuitry that is operable to implement a finite state machine via said feedback input.

* * * * *